Dec. 1, 1964   M. M. ROSENFELD   3,159,117
CYLINDRICAL BOMBSHELTER
Filed Sept. 5, 1961
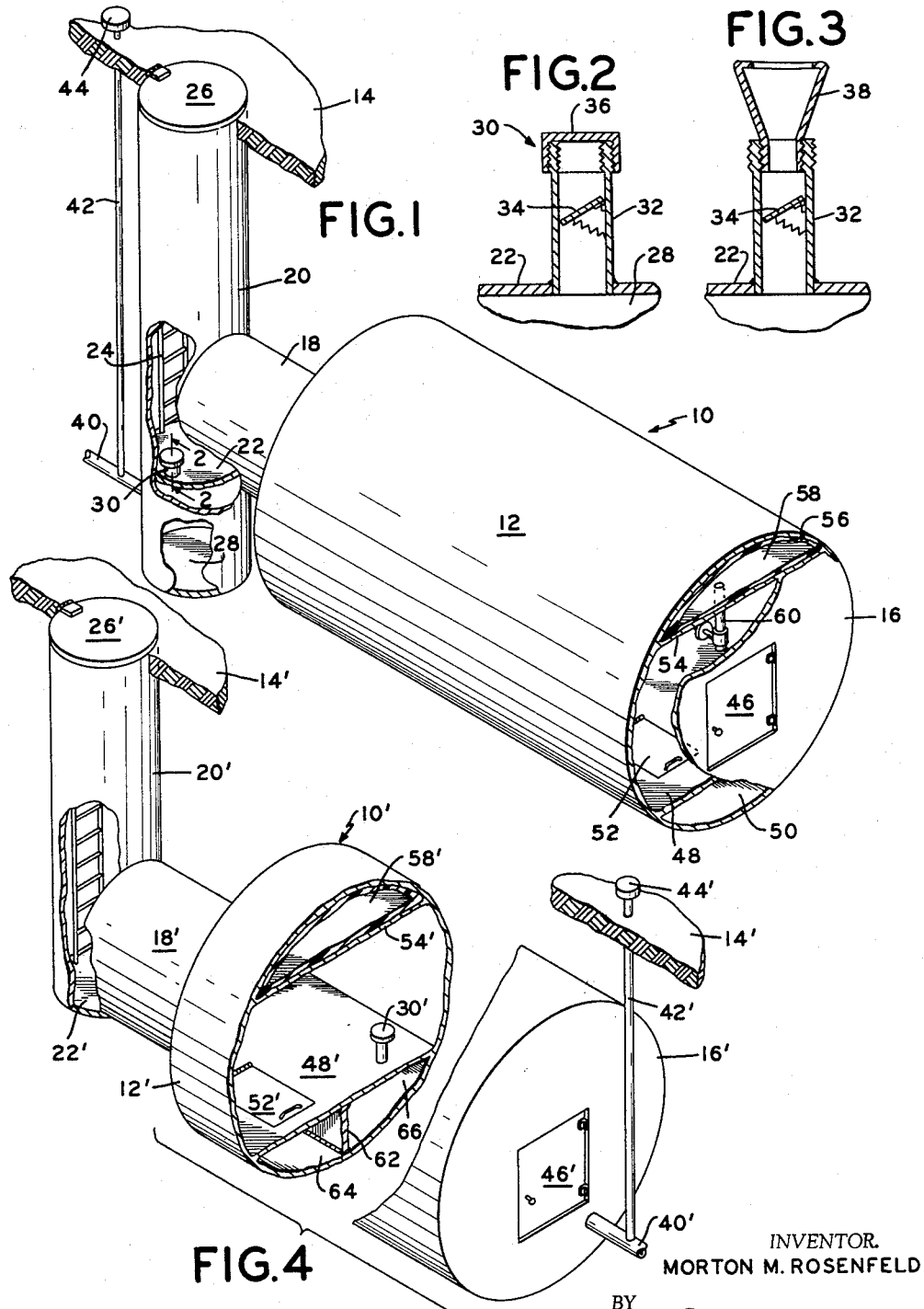
INVENTOR.
MORTON M. ROSENFELD
BY
Arthur H. Seidel
ATTORNEY

United States Patent Office 3,159,117
Patented Dec. 1, 1964

3,159,117
CYLINDRICAL BOMBSHELTER
Morton M. Rosenfeld, Mount Vernon, N.Y.
(271 Madison Ave., New York, N.Y.)
Filed Sept. 5, 1961, Ser. No. 135,901
4 Claims. (Cl. 109—1)

This invention relates to a cylindrical bombshelter, and more particularly to a cylindrical bombshelter having a waste disposal unit therein.

The bombshelter of the present invention is composed of cylindrical elements disposed underground. In the event of a nuclear bombing, access may be had to the bombshelter of the present invention from ground level or from an adjoining building such as the basement of a home or the like. The bombshelter of the present invention has a waste disposal unit incorporated therein. The waste disposal unit is of a size so that it may accommodate the waste from the persons using the bombshelter for a period of thirty days or more.

Heretofore, bombshelters have not been provided with a waste disposal unit integrally incorporated therein. The recent developments in nuclear weapons indicate that it may be necessary to remain within a bombshelter for periods of thirty days or more. Unless a waste disposal unit of sufficient size is provided in the bombshelter, life within the bombshelter for a period of thirty days or more may be extremely uncomfortable.

It is an object of the present invention to provide a novel cylindrical bombshelter.

It is another object of the present invention to provide a novel cylindrical bombshelter having a waste disposal means incorporated therein.

It is a further object of the present invention to provide a novel cylindrical bombshelter having walls defining a plurality of compartments above and below the space to be occupied by personnel.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a perspective view, with parts broken away for clarity, of the novel bombshelter of the present invention disposed underground.

FIGURE 2 is a sectional view taken along lines 2—2 in FIGURE 1.

FIGURE 3 is a sectional view similar to FIGURE 2 illustrating the manner in which the waste materials may enter the disposal unit.

FIGURE 4 is a sectional view, with parts broken away for clarity of illustration, of another embodiment of the present invention.

Referring to the drawing in detail, wherein like numerals indicate like elements, there is shown in FIGURE 1 an underground cylindrical bombshelter designated generally as 10.

The bombshelter 10 comprises a cylindrical shell 12 disposed underground with its longitudinal axis being substantially parallel to the ground level 14. The cylindrical shell 12 is the main portion of the bombshelter and is the portion in which personnel will remain until the danger of radiation and radioactive dust has passed. Since the shell 12 is cylindrical, it offers the maximum amount of strength for a bombshelter. The shell 12 may be made of metal or concrete.

The shell 12 is provided with an end wall 16 at one end thereof. A cylindrical extension 18 extends from the other end wall on the shell 12. The cylindrical extension 18 has a diameter which is less than the diameter of the shell 12. The end of the extension 18 remote from the end wall of the shell 12 is fixedly secured to a cylindrical escape tube 20 adjacent a floor 22 in the tube 20. The tube 20 extends to the ground level 14 and includes a ladder 24 and a hatch 26. The hatch 26 is pivotably secured to the tube 20 adjacent the ground level.

The tube 20 and the extension 18 cooperate to provide one means for access to the interior of the cylindrical shell 12. The tube 20 has an extension below the floor 22. Such extension includes a chamber 28. The chamber 28 is a waste disposal tank of sufficient size to accommodate the waste from a normal family for a period of thirty days or more.

An inlet means 30 is provided in the floor 22 to provide access to the chamber 28. As shown more clearly in FIGURES 2 and 3, the inlet means 30 comprises a cylindrical pipe 32 having one end fixedly secured to the floor 22. Means for providing flow in only one direction within the pipe 32 are provided. Such means include the flap valve 34. The upper end of the pipe 32 is provided with internal and external threads. An imperforate cup-shaped cap 36 is removably secured to the external threads on the upper end of the pipe 32. The internal threads on the upper end of the pipe 32 selectively cooperate with external threads on a funnel-shaped adapter.

The cap 36 is secured to the pipe 32 in the manner illustrated in FIGURE 2 at all times except when it is desired to introduce waste material into the chamber 28. When it is desired to introduce waste materials into the chamber 28, the cap 36 is removed and the adapter 38 secured in the manner illustrated in FIGURE 3. The adapter 38 enables urine, solid excretions, etc. to be introduced into the chamber 28. The chamber 28 may be provided with conventional chemicals normally utilized in septic tanks. If desired, the chamber 28 may be provided with an overflow pipe 40 which is directed to a leaching field, cesspool, sewer pipe, etc.

If the overflow pipe 40 is provided, a vent pipe 42 extends therefrom to a point above the ground level 14. The upper end of the vent pipe 42 is provided with a vent cap. If the overflow pipe 40 is not provided, the lowermost end of the vent pipe 42 will be in communication with the upper end of the chamber 28 so as to prevent gases from building up therein.

As shown more clearly in FIGURE 1, end wall 16 is provided with a door 46. The door 46 provides a second means for access to the interior of the shell 12. The door 46 may communicate with an adjoining building such as the basement of a residence or the like.

A horizontally disposed floor 48 is provided within the cylindrical shell 12. The floor 48 lies in a plane substantially parallel to the longitudinal axis of the shell 12 and the ground level. A trap door 52 is provided in the floor 48 so as to selectively provide access to the chamber 50 disposed below the floor 48. A ceiling 54 is provided within the shell 12. The ceiling 54 lies in a plane substantially parallel to the plane of the floor 48. The space within the shell 12 and between the floor 48 and ceiling 54 constitutes the living space for the personnel adapted to use the bombshelter 10.

A plastic liner 56 is disposed within the space within the shell 12 and above the ceiling 54. The liner 56 defines a chamber 58 within which drinking water and the like may be disposed. An outlet pipe 60 having a valve on its free end communicates with the chamber 58. Drinking water or the like is disposed within the chamber 58 and may be removed therefrom through the pipe 60 under the force of gravity.

An alternative embodiment of the present invention designated 10' is illustrated in FIGURE 4. The bombshelter 10' is substantially identical with the bombshelter 10. Accordingly, like elements are provided with primed numerals.

In the bombshelter 10', the floor 22' is an end wall of the tube 20'. An upright wall 62 extends between the cylindrical shell 12' and a lowermost surface on the floor 48'. The wall 62 divides the space below the floor 48' into storage chamber 64 and chamber 66. The chamber 66 performs the same function as chamber 28. Thus, an inlet means 30' is provided in the floor 48' over the chamber 66. The chamber 66 may be provided with an overflow pipe 40' extending from the end wall 16'. The overflow pipe 40' may be provided with a vent pipe 42' having a cap 44' at its uppermost end above the ground level 14'.

Thus, it will be seen that each of the cylindrical bombshelters 10 and 10' of the present invention are provided with an integral waste disposal means of sufficient size so as to accommodate personnel for thirty days or more. Each bombshelter of the present invention is provided with an access means as each end thereof. Thus, if one access means is blocked, persons in the cylindrical shell of each embodiment may leave the same through the other access means.

The present invention may be embodied in other specific forms without departing from the spirit or essential attributes thereof and, accordingly, reference should be made to the appended claims, rather than to the foregoing specification as indicating the scope of the invention.

I claim:

1. A bombshelter comprising a first cylindrical shell, a second cylindrical shell, said second cylindrical shell being smaller in diameter than said first cylindrical shell, the longitudinal axis of said second shell being substantially perpendicular to the longitudinal axis of said first shell, means providing communication between said shells, a floor in one of said shells, a waste disposal chamber below and partially defined by said floor in said one shell, an inlet means supported by said floor and selectively providing communication between said chamber and the space within the shell thereabove, said inlet means comprising a pipe, and threads on one end of said pipe above the plane of said floor for alternatively receiving an imperforate cap and a funnel-shaped member.

2. A bombshelter in accordance with claim 1 including a check valve in said pipe.

3. A bombshelter comprising a first cylindrical shell, a second cylindrical shell, said second cylindrical shell being smaller in diameter than said first cylindrical shell, the longitudinal axis of said second shell being substantially perpendicular to the longitudinal axis of said first shell, means providing communication between said shells, a floor in one of said shells, a waste disposal chamber below and partially defined by said floor in said one shell, an inlet means supported by said floor and selectively providing communication between said chamber and the space within the shell thereabove, said first shell being provided with an end wall, a door in said end wall for providing access to the interior of said first shell, a ceiling in said first shell, said ceiling lying in a plane substantially parallel to the longitudinal axis of said first shell, said ceiling cooperating with a portion of said first shell to define a crescent-shaped chamber, and an imperforate liner within said crescent-shaped chamber.

4. A bombshelter comprising a first cylindrical shell, a second cylindrical shell, said second cylindrical shell being smaller in diameter than said first cylindrical shell, the longitudinal axis of said second shell being substantially perpendicular to the longitudinal axis of said first shell, means providing communication between said shells, a floor in one of said shells, a waste disposal chamber below and partially defined by said floor in said one shell, an inlet means supported by said floor and selectively providing communication between said chamber and the space within the shell thereabove, a ceiling in said first shell subtending an arc of said first shell, the space above said ceiling being adapted for storing liquids, a valved outlet pipe providing selective communication between the space above and below said ceiling, and said one shell being said first shell.

References Cited in the file of this patent

UNITED STATES PATENTS

| 251,767 | Daniell | Jan. 3, 1882 |
| 423,006 | Walter | Mar. 11, 1890 |
| 1,301,977 | Russell | Apr. 29, 1919 |
| 1,709,701 | Althoff | Apr. 16, 1929 |
| 2,397,184 | Klose | Mar. 26, 1946 |

FOREIGN PATENTS

| 287,262 | Switzerland | Mar. 16, 1953 |
| 829,312 | France | Mar. 28, 1938 |